United States Patent [19]

Dechant et al.

[11] 4,267,568

[45] * May 12, 1981

[54] INFORMATION STORAGE AND RETRIEVAL SYSTEM

[75] Inventors: Thomas E. Dechant, Bainbridge, Ohio; Edward L. Glaser; Paul E. Pitt, both of Santa Monica, Calif.; Frederick Way, Cleveland Heights, Ohio

[73] Assignee: System Development Corporation, Santa Monica, Calif.

[ * ] Notice: The portion of the term of this patent subsequent to Jan. 10, 1995, has been disclaimed.

[21] Appl. No.: 847,561

[22] Filed: Nov. 1, 1977

Related U.S. Application Data

[63] Continuation of Ser. No. 637,511, Dec. 3, 1975, Pat. No. 4,068,298.

[51] Int. Cl.³ .............................................. G06F 15/40
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,576,534 | 4/1971 | Steinberger | 340/146.3 Q |
| 3,603,937 | 9/1971 | Loizides et al. | 364/900 |
| 3,612,660 | 10/1971 | Miller | 340/347 DD |
| 3,618,027 | 11/1971 | Feng | 364/900 |
| 3,643,226 | 2/1972 | Loizides et al. | 364/900 |
| 3,651,483 | 3/1972 | Clark et al. | 364/200 |
| 3,670,310 | 6/1972 | Bharwani et al. | 364/200 |
| 3,678,641 | 7/1972 | Choate et al. | 364/200 |
| 3,689,915 | 9/1972 | De Clerck et al. | 340/347 DD |
| 3,697,950 | 10/1972 | Low et al. | 340/146.1 AQ |
| 3,697,951 | 10/1972 | Bartholomew et al. | 340/146.3 Q |
| 3,729,718 | 4/1973 | Dufton et al. | 364/200 |
| 3,793,513 | 2/1974 | Kaneko | 364/514 |
| 3,821,711 | 6/1974 | Elam et al. | 340/347 DD |
| 3,906,455 | 9/1975 | Houston et al. | 364/200 |
| 3,916,387 | 10/1975 | Woodrum | 364/200 |
| 3,938,105 | 2/1976 | Lechner | 364/900 |
| 4,084,260 | 4/1978 | Fleming et al. | 364/900 |

FOREIGN PATENT DOCUMENTS 1247006 3/1968 United Kingdom .
1363810 7/1972 United Kingdom .

OTHER PUBLICATIONS

Brewer, S., "Data Base or Data Maze? An Exploration of Entry Points," *Proceedings of the 23rd ACM National Conference*, 1968, p. 623.

James L. Massey, "Shift-Register Synthesis and BCH Decoding," IEEE Transactions on Information Theory, vol. IT-15, No. 1, Jan. 1969, pp. 122-126.

Lawrence T. Fisher, "Unateness Properties of AND--Exclusive-OR Logic Circuits," IEEE Transactions on Computers, vol. C-23, No. 2, Feb. 1974, pp. 166-172.

W. D. Hagamen, D. J. Linden, H. S. Long, J. C. Weber, "Encoding Verbal Information as Unique Numbers," IBM Syst. J., No. 4, 1972, pp. 278-315.

Jon Louis Bently, "Multidimensional Binary Search Trees Used for Associative Searching," 1975 ACM Student Award Paper, Communications of the ACM, vol. 18, No. 9, Sep. 1975, pp. 509-517.

H. Ling, F. P. Palermo, "Block-Oriented Information Compression," IBM J. Res. Develop., Mar. 1975, pp. 141-145.

P. A. D. De Maine and B. A. Morron, "The Solid System, I, A Method for Organizing and Searching Files, and the Solid System, II, Alphanumeric Compression," pp. 243-282, George Schecter (ed.) Information Retrieval-A Critical View, Thompson Book Company, Washington, D.C., 1967.

B. A. Marron and P. A. D. De Maine, "Automatic Data Compression," Communications of the ACM, vol. 10, No. 11, Nov. 1967, pp. 711-715.

P. A. D. De Maine, K. Kloss, B. A. Marron, "The Solid System, II Numeric Compression, and The Solid System, III Alphanumeric Compression," pp. 1-25, 27-42, NBS Technical Note 413, Superintendent of Documents, U.S. Government Printing Office, Washington, D.C. 20402, Aug. 15, 1967.

E. Henry Beitz, "A Set-Theoretic View of Data-Base Representation," ACM Sigmod Workshop on Data Description, Access and Control, ACM Sigfidet, Apr. 1974, pp. 478-494.

E. Henry Beitz, "Sets as A Model for Data Base Representation, Much Ado About Something," ACM Regional Conference, Pacific, 1975, pp. 80-84.

Bryant et al., "GIS and File Management," *Proceeding of the 21st National Conference of the ACM,* 1966, pp. 97-107.

*Primary Examiner*—Raulfe B. Zache
*Attorney, Agent, or Firm*—Christie, Parker & Hale

[57] ABSTRACT

Method and means using order of occurrence of entries and of events within entries for creating a data base and/or for finding a predetermined degree of match between the order of occurrence of events and entries in a request and a stored data base and/or for recreating an input in the original order of occurrence from a data base representing the order of occurrence of entries and events.

36 Claims, 1 Drawing Figure

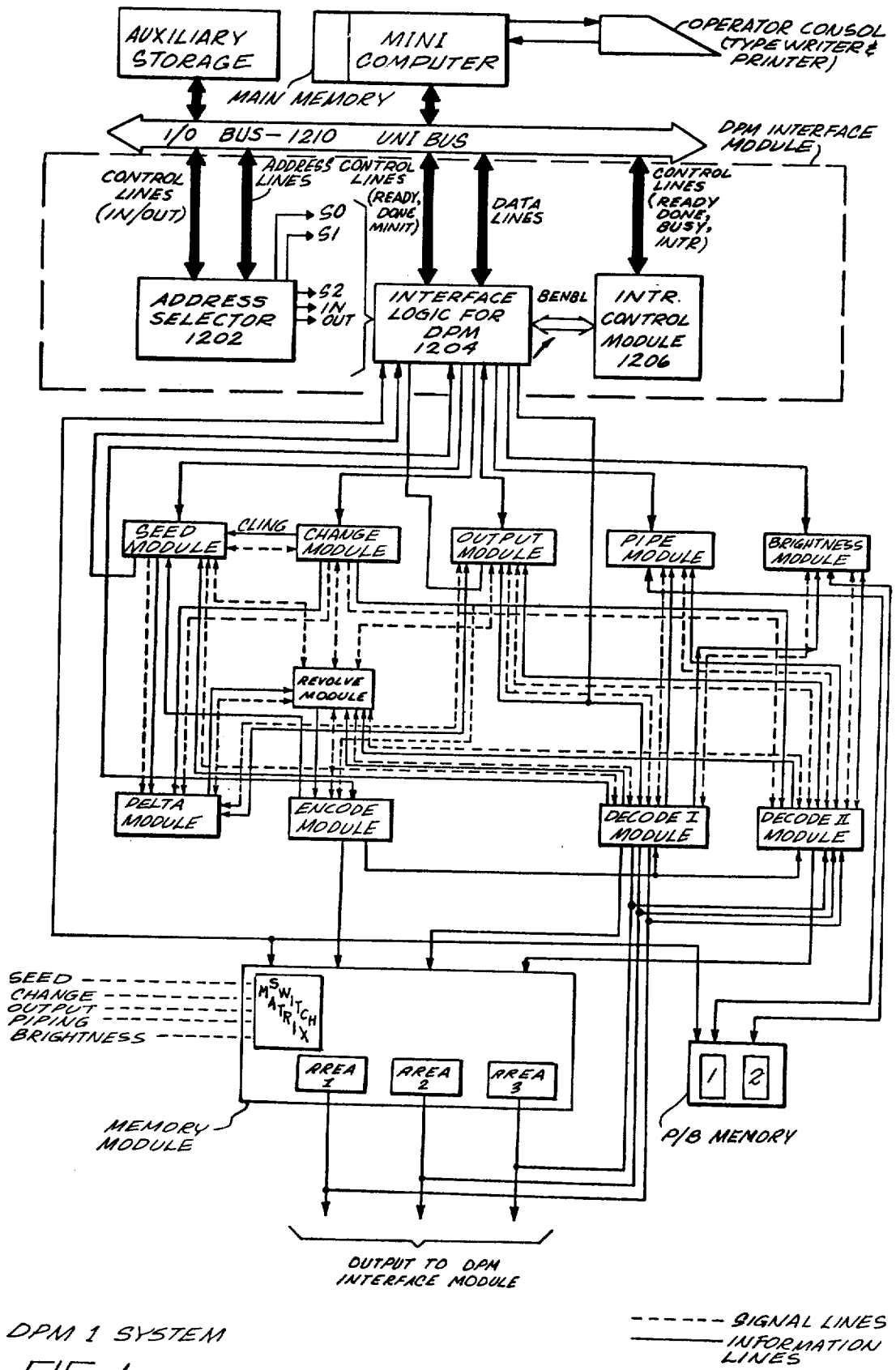

INFORMATION STORAGE AND RETRIEVAL SYSTEM

CROSS REFERENCE TO RELATED APPLICATIONS

This is a continuation of application Ser. No. 637,511 filed Dec. 3, 1975.

BACKGROUND OF THE INVENTION

This invention relates to information storage and retrieval systems.

Some of the advantages gained from using the techniques according to the present invention may be summarized as follows: (1) less physical storage is required, (2) faster retrieval time, (3) ease of restructuring and updating a data base, (4) ease of specifying a new retrieval criteria, and (5) ease of specifying and carrying out a process.

From the user's point of view, there are two characteristics of an embodiment of the invention which profoundly change conventional modes of dealing with an information storage and retrieval system. One characteristic concerns the absence of the need for descriptors, and another concerns file compression.

Additionally the data which is to be entered into the system for later retrieval need not be categorized, indexed, described, or even formated for the purpose of retrieval. Should the user wish to set up a structure of categories containing descriptors or indices because it makes it easier for him, he may of course do so. An important distinction here is that an embodiment of this invention need never impose such structures upon the process. Even though the system can accommodate such structures, it does not require them.

The same flexibilities characterize the making of inquiries of a memory system according to this invention. The inquirer can simply ask questions in whatever form, using whatever words occur to him. Usually the person attempting to use an information storage and retrieval system has no trouble stating his inquiry in such a way that he understands it, and in such a way that other people understand it. The difficulty arises when he tries to translate his inquiry into an equivalent question which meets the acceptance requirements imposed by conventional information storage and retrieval systems.

With prior information storage and retrieval systems, limits have to be set on the inquiry process. Since an embodiment of this invention does not impose any requirements on the inquiry process, necessary control is vested where it belongs, namely, with the user. The most important control the user exercises concerns the degree of exactness of the match between his inquiry and the contents of the data base. The maximum setting on his "degree of exactness" control would be that for an exact match. Should an exact match not be found, the system can be arranged to tell the user that the situation exists and indicate that change must be made in the exactness setting so that the inquiry will retrieve at least one relevant item.

The exactness control setting has no effect whatsoever on the search time of the holotropic memory system. However, since it indirectly controls the amount of data retrieved, it does effect the total response time in the sense that more retrieved data will take longer to display in print.

Because of the differences in the techniques of the inquiry process between traditional systems and methods and means embodying the present invention, the structure of the latter may be vastly different. In traditional retrieval information storage and retrieval systems, an inquiry can be rejected because it contains an unallowable descriptor, or because something is misspelled, or because the parts are ordered improperly, or because the inquiry is not framed according to the specifications. Thus, an inquiry can be rejected regardless of whether the information it asked for is actually in the data base. In a storage and retrieval system according to the present invention, no inquiry need ever be rejected for such reasons. The only sense in which an inquiry needs to be "rejected" is that it fails to retrieve. In other words, the data base does not contain anything which matches the inquiry at the specified level of exactness.

Another consideration for a storage and retrieval method and apparatus embodying the present invention is file compression. The nature of the system is such that the stored data may be compressed into less space than would be used to store the data with presently available techniques. This is true even if it were entered as a linear string, that is, as a single record.

A storage and retrieval system according to the present invention compresses input data by automatically taking advantage of any redundancy. In one test, a 10,000-word sample of ordinary English prose was compressed to approximately one-half the space which would have been required had the sample (without any index tables, pointers, or other artifacts) been stored as a single record in a traditional information storage and retrieval system. The exploitation of these redundancies occurs at all levels. Once a character, a word, a sentence, a paragraph, or any other arbitrarily specified input element has been encountered, no subsequent occurences of that same element need be stored in their original form. Instead, the system notes that a previously encountered element has occurred again, in a manner which permits reconstitution of any or every one of the multiple input elements in its original context.

Significantly, the invention can be implemented in software, but some or all are much more efficient when implemented in microcode, and are maximally efficient when implemented directly in hardware. However, even where implemented in software or microcode, the present invention can perform more efficiently in terms of storage, speed, etc. than presently known techniques. At the hardware level, it can take full advantage of the unique properties of the latest components, such as, charge couple devices, magnetic-bubble logic, and memory, etc.

The present invention is applicable alike to large computers (for example, information storage and retrieval systems), to subsystems (for example, intelligent disk storage devices), or to very small stand-alone machines (for example, battery-driven calculators).

SUMMARY OF THE INVENTION

Briefly, an embodiment of this invention is a method utilizing digital data processing means for creating a multi-layer data base in a store and for reproducing the data base. A sequence of first level events which represent a sequence of first level entries are received as input. The first level entries form a sequence of second level events within a plurality of second level entries. The events and entries, received as input, are utilized for creating a multilayer data base in the store including the steps of forming digitally coded signals in a first data base layer representing the order of occurrence of first level events in each of a plurality of first level entries, and forming digitally coded signals in a second data base layer representing the order of occurrence of second level events in each of a plurality of second level entries. Each of a plurality of second level events represented in the second layer have a corresponding first level entry represented in the first layer, such first level entry being represented by the order of occurrence of first level events within the first level entry. The events and entries are reproduced in the same order received as input utilizing the first data base layer to order first level events and utilize the second data base layer to order first level entries within second level entries.

A method according to the invention uses a digital data processor for locating in a memory a portion of a stored data base, the data base being represented by digital coded signals which represent the order of occurrence of plural events within each of plural entries. A request is formed comprising a series of digital coded event signals representing events of an entry. The request is utilized to form digital coded signals representing the order of occurrence of the events within the entry of the request. The stored data base is utilized to form digital coded signals representing the data base order of occurrence for those events which are present in the request. Any one of a plurality of possible degrees of match between the positional order of events in the request and the same events in the data base is selected. The digital coded signals representing the order of occurrence of the request, the digital coded signals representing the data base order of occurrence, and the selected possible degrees of match are used for identifying those data base entries which have the selected degree of match.

Preferably a newly received first level entry which is identical to a previously received first level entry is added to the data base. The steps of forming include the additional steps of comparing for an identity the order of occurrence of the first level events in the newly received first level entry with the order of occurrence of the same events in the first level entries which are represented in the first layer and, conditioned upon the lack of identity, selectively forming, in the first layer, such digitally coded signals representing the order of occurrence of the first level events in the newly received first level entry, and forming, in the second layer, such digitally coded signal representing the order of occurrence of a second level event corresponding to the newly received first level entry.

A method according to the invention also uses a data processor for locating in a memory a portion of a stored data base, the data base comprising a plurality of layers, each layer comprising digital coded signals representing the order of occurrence of events in each of a plurality of entries for the layer, the entries on at least one first layer corresponding to the events in a second layer. A series of digital coded event signals are formed as a request and represent events of first and second level entries. The events of second level entries are entries in the first level entry. The request is utilized to form digital coded signals representing the order of occurrence of the events within the respective entries of the request. The first and second layers of the stored data base are utilized to form digital coded signals representing the data base order of occurrence for those events in the data base which are present in the request. The digital coded signals formed in the last two steps are utilized for identifying data base entries in each said first and second layers which have a predetermined degree of match in order of occurrence of events with events of the request.

A method according to the invention also utilizes a digital data processing system having a memory for creating a digital coded data base in such memory from a plurality of coded event signals in a desired order of occurrence, at least some event signals representing occurrence, at least some event signals representing different occurrences of the same event and at least one event signal representing an event which is different from another one, said event signals, together, representing a sequence of entries, some of said entries being the same and at least one being different. A first event-time indication is formed for the events indicating the order of occurrence thereof and a second event-time indication is formed for the entries indicating the order of occurrence thereof. A stored multi-layered data base is entered in the memory and represents the events and entries. During entry in the memory a first data base layer is formed using the step of storing in the memory retrievable first layer event-time signals representing the first event-time indications and which represent the order of occurrence of the events within entries, and a second data base layer is formed using the step of storing in the memory retrievable second layer event-time signals which represent the second event-time indications and which represent the order of occurrence of the corresponding entries. The step of forming a first data base layer includes the step of forming, for each different type event, a separate retrievable first layer event-time indication which indicates all occurrences of the same type event. The step of forming a second data base layer comprises the step of forming, for each different type entry, a separate retrievable second layer event-time indication which indicates all occurrences of the same type entry.

Means is also disclosed for carrying out the aforegoing methods.

BRIEF DESCRIPTION OF THE DRAWINGS

FIG. 1 is a general block diagram of the data processing machine (DPM).

The specification of U.S. Pat. No. 4,068,298, column 11, line 30 through the end of the specification at column 518, and all of the drawings subsequent to FIG. 1, are hereby incorporated herein by reference, together with the changes to be made by the Request for Certificate of Correction filed June 24, 1980 for U.S. Pat. No. 4,068,298, and with the following changes in such patent:

Column 12, between lines 8 and 9, insert the following:
  —FIGS. 39, 40 and 41 form a flow diagram illustrating the sequence of operation of the PIPE MODULE;—
  —Column 147, line 8, delete "which" and substitute therefor—where the delimiters—; line 10, "letters" should be—events—;
  —Column 147, line 44, "entries" should be —events—; line 57, "in" should be —for—.
  —Column 233, line 68, "in" should be—to—.

What is claimed:

1. A method utilizing digital data processing means for creating a multi-layer data base in a store and for reproducing the data base comprising the steps of:
  (a) receiving as input a sequence of first level events which represent a sequence of first level entries, the first level entries forming a sequence of second level events within a plurality of second level entries;

(b) utilizing the events and entries, received as input, for creating a multi-layer data base in the store including the steps of:

(1). forming digitally coded signals in a first data base layer representing the order of occurrence of first level events in each of a plurality of first level entries, and (2). forming digitally coded signals in a second data base layer representing the order of occurrence of second level events in each of a plurality of second level entries, each of a plurality of second level events represented in the second layer having a corresponding first level entry represented in the first layer, such first level entry being represented by the order of occurrence of first level events within such first level entry; and (c) reproducing events and entries in the same order received as input utilizing the first data base layer to order first level events and utilizing the second data base layer to order first level entries within second level entries.

2. A method according to claim 1 wherein a newly received first level entry which is identical to a previously received first level entry is added to the data base, the steps of forming comprising the additional steps of:

(a) comparing for an identity the order of occurrence of the first level events in the newly received first level entry with the order of occurrence of the same events in the first level entries which are represented in the first layer and, conditioned upon the lack of identity, selectively forming, in the first layer, such digitally coded signals representing the order of occurrence of the first level events in the newly received first level entry; and (b) forming, in the second layer, such digitally coded signal representing the order of occurrence of a second level event corresponding to the newly received first level entry.

3. A method according to claim 1 comprising the additional steps of:

(a) detecting a first level event representing a delimiter for the newly received first level entry; and (b) responsive to the detection, enabling the steps of comparing and selectively forming such digitally coded signals in the first layer.

4. A method according to claim 3 comprising the additional steps of:

(a) detecting a first level event in the input representing a delimiter for a newly received second level entry wherein the latter contains the newly received first level entry; and (b) responsive to the detection of the last named delimiter, forming, in the second layer, such digitally coded signals representing the order of occurrence of second level events in such newly received second level entry.

5. A method utilizing digital data processing means for creating a multi-layer data base in a store and for reproducing the data base comprising the steps of:

(a) receiving as input a sequence of first level events which represent a sequence of first level entries, the first level entries forming a sequence of second level events within a plurality of second level entries, the first level events representing first and second delimiters defining the boundaries of, respectively, the first and second level entries;

(b) forming digitally coded signals in a first data base layer representing the order of occurrence of the first level events in each of a plurality of first level entries, and comprising the steps of:

(1). forming in a first store a digitally coded signal for each first level event in a newly received first level entry of the input, the digitally coded signals in the first store representing the order of occurrence of the first level events in the corresponding first level entry, (2). detecting the first delimiter in the input for the newly received first level entry, and (3). responding to the detection of the first delimiter for comparing the order of occurrence represented in the first store and the order of occurrence of the same events in entries represented by the first layer and, responsive to an inequality in comparing, for selectively forming in the first layer digitally coded signals representing the order of occurrence which is represented in the first store, and (c) forming digitally coded signals in a second data base layer representing the order of occurrence of second level events in each of a plurality of second level entries, each of a plurality of second level events represented in the second layer having a corresponding first level entry represented in the first layer and comprising the steps of:

(1.) forming in a second store a digitally coded signal for each second level event in a newly received second level entry of the input, the digitally coded signals in the second store representing the order of occurrence of the second level events in the corresponding second level entry, (2.) detecting the second delimiter in the input for the newly received second level entry, and (3.) responding to the detection of the second delimiter for forming digitally coded signals in the second layer representing the order of occurrence which is represented in the second store; and (d) reproducing events and entries in the same order received as input utilizing the first data base layer to order first level events and utilizing the second data base layer to order first level entries within second level entries.

6. Digital data processing means having a store and for creating a multi-layer data base in the store and for reproducing the data base comprising:

(a) means for receiving as input a sequence of first level events which represent a sequence of first level entries, the first level entries forming a sequence of second level events within a plurality of second level entries;

(b) means for utilizing the events and entries, received as input, for creating a multi-layer data base in the store and comprising:

(1.) means for forming digitally coded signals in a first data base layer representing the order of occurrence of first level events in each of a plurality of first level entries, and (2.) means for forming digitally coded signals in a second data base layer representing the order of occurrence of second level events in each of a plurality of second level entries, each of a plurality of second level events represented in the second layer having a corresponding first level entry represented in the first layer, such first level entry being represented by the order of occurrence of first level events within such first level entry; and (c) means for reproducing events and entries in the same order received as input utilizing the first data base layer to order first level events and utilizing the second data base layer to order first level entries within second level entries.

7. Digital data processing means according to claim 6 wherein a newly received first level entry which is identical to a previously received first level entry is added to the data base, the means for forming signals in a second data base layer comprising:

(a) means for comparing for an identity the order of occurrence of the first level events in the newly received first level entry with the order of occurrence of the same events in the first level entries which are represented in the first layer and, conditioned upon the lack of identity, means operative for selectively forming, in the first layer, such digitally coded signals representing the order of occurrence of the first level events in the newly received first level entry; and (b) means for forming, in the second layer, such digitally coded signal representing the order of occurrence of a second level event corresponding to the newly received first level entry.

8. Digital data processing means according to claim 7 comprising:

(a) means for detecting a first level event representing a delimiter for the newly received first level entry; and (b) means responsive to the detection for enabling the means for comparing and the means for selectively forming such digitally coded signals in the first layer.

9. Digital data processing means according to claim 8 comprising:

(a) means for detecting a first level event in the input representing a delimiter for a newly received second level entry wherein the latter contains the newly received first level entry; and (b) means responsive to the detection of the last named delimiter for forming, in the second layer, such digitally coded signals representing the order of occurrence of second level events in such newly received second level type entry.

10. Digital data processing means for creating a multi-layer data base in a store and for reproducing the data base comprising:

(a) means for receiving as input a sequence of first level events which represent a sequence of first level entries, the first level entries forming a sequence of second level events within a plurality of second level entries, the first level events representing first and second delimiters defining the boundaries of, respectively, the first and second level entries;

(b) means for forming digitally coded signals in a first data base layer representing the order of occurrence of the first level events in each of a plurality of first level entries and comprising (1.) a first store, (2.) means for forming in the first store a digitally coded signal for each first level event in a newly received first level entry of the input, the digitally coded signals in the first store representing the order of occurrence of the first level events in the corresponding first level entry, (3.) means for detecting the first delimiter in the input for the newly received first level entry, and (4.) means for responding to the detection of the first delimiter for comparing the order of occurrence represented in the first store and the order of occurrence of the same events in entries represented by the first layer and, responsive to an inequality in comparing, for selectively forming in the first layer digitally coded signals representing the order of occurrence which is represented in the first store, and (c) means for forming digitally coded signals in a second data base layer representing the order of occurrence of second level events in each of a plurality of second level entries, each of a plurality of second level events represented in the second layer having a corresponding first level entry represented in the first layer and comprising (1.) a second store, (2.) means for forming in the second store a digitally coded signal for each second level event in a newly received second level entry of the input, the digitally coded signals in the second store representing the order of occurrence of the second level events in the corresponding second level entry, (3.) means for detecting the second delimiter in the input for the newly received second level entry, and (4.) means for responding to the detection of the second delimiter for forming digitally coded signals in the second layer representing the order of occurrence which is represented in the second store; and (d) means for reproducing events and entries in the same order received as input utilizing the first data base layer to order first level events and utilizing the second data base layer to order first level entries within second level entries.

11. A method using a data processor for locating in a memory a portion of a stored data base, the data base comprising a plurality of layers, each layer comprising digital coded signals representing the order of occurrence of events in each of a plurality of entries for the layer, the entries on at least one first layer corresponding to the events in a second layer, the method comprising the steps of:

(a) forming, as a request, a series of digital coded event signals representing events of first and second level entries, the events of second level entries being entries in the first level entry;

(b) utilizing the request to form digital coded signals representing the order of occurrence of the events within the respective entries of the request;

(c) utilizing the first and second layers of the stored data base to form digital coded signals representing the data base order of occurrence for those events in the data base which are present in the request; and (d) utilizing the digital coded signals formed in the last two steps for identifying data base entries in each said first and second layers which have a predetermined degree of match in order of occurrence of events with events of the request.

12. Data processing means for locating in a memory a portion of a stored data base, the data base comprising a plurality of layers, each layer comprising digital coded signals representing the order of occurrence of events in each of a plurality of entries for the layer, the entries on at least one first layer corresponding to the events in a second layer, comprising:
  (a) means for forming, as a request, a series of digital coded event signals representing events of first and second level entries, the events of second level entries being entries in the first level entry;
  (b) means for utilizing the request to form digital coded signals representing the order of occurrence of the events within the respective entries of the request;
  (c) means for utilizing the stored data base to form digital coded signals representing the data base order of occurrence for those events in the data base which are present in the request; and
  (d) means for utilizing the digital coded signals formed by the last two named means for identifying data base entries in each said first and second layers which have a predetermined degree to match in order of occurrence of events with events of the request.

13. A method utilizing a digital data processing system for creating in a memory thereof a digitally coded data base from received data and for retrieving from the data base, the received data being represented by plural levels of entries, each of said levels of entries comprising a plurality of definable entries which in turn are represented by a plurality of events, events of at least one level of entry comprising an entry of another level, comprising the steps of:
  (a) forming for each such level of entry, indications of the order of occurrence for the events within the entries thereof;
  (b) forming from said indications and in the memory a layer of digitally coded signals, for each such level of entry, such that each layer represents the order of occurrence of the events within the entries of the corresponding level of entry;
  (c) forming in the memory digitally coded signal representations of different levels of events received in the data for at least one such level of entry corresponding to one of the layers;
  (d) forming signals representing the relation between the event occurrences in one layer and the corresponding entries, represented by event occurrences, of another layer; and
  (e) utilizing the representations of different levels of events, the layers of digitally coded signals and the signals representing the relation between events in one layer and corresponding entries in another layer for recreating events for output corresponding to the event representations and in the order of occurrence in the received data.

14. Digital data processing means for creating in a memory thereof a digitally coded data base from received data and for retrieving from the data base, the received data being represented by plural levels of entries, each of said levels of entries comprising a plurality of definable entries which in turn are represented by a plurality of events, events of at least one level of entry comprising an entry of another level, comprising:
  (a) means for forming for each such level of entry, indications of the order of occurrence for the events within the entries thereof;
  (b) means for forming from said indications and in the memory a layer of digitally coded signals, for each such level of entry, such that each layer represents the order of occurrence of the events within the entries of the corresponding level of entry;
  (c) means for forming in the memory digitally coded event signal representations for different levels of events received in the data for at least one such level of entry and hence corresponding to one of the layers;
  (d) means for forming signals representing the relation between the event occurrences in one layer and the corresponding entries, represented by event occurrences, of another layer; and
  (e) means for utilizing the representations of different levels of events, the layers of digitally coded signals and the signals representing the relation between events in one layer and corresponding entries in another layer for recreating events for output corresponding to the event representations in the order of occurrence in the received data.

15. A method using a digital data processor for locating in a memory, a portion of a stored data base, the data base being represented by digital coded signals which represent the order of occurrence of plural events within each of plural entries, the method comprising the steps of:
  (a) forming, as a request, a series of digital coded event signals representing events of an entry;
  (b) utilizing the request to form digital coded signals representing the order of occurrence of the events within the entry of the request;
  (c) utilizing the stored data base to form digital coded signals representing the data base order of occurrence for those events which are present in the request;
  (d) selecting any one of a plurality of possible degrees of match between the positional order of events in the request and the same events in the data base; and;
  (e) utilizing the digital coded signals forms in steps (b) and (c) and the selected possible degrees of match for identifying those data base entries which have the selected degree of match.

16. A method according to claim 15 comprising the additional steps of:
  (a) forming as input to the data processor a pipe width signal identifying a permissible mismatch between the positional order of occurrence of events of the request and the corresponding events in the entry of the data base; and
  (b) utilizing a value corresponding to the pipe width signal in the step of identifying entries having a selected degree of match.

17. A method according to claim 16 comprising the additional steps of:
  (a) forming as input to the data processor a further value identifying a predetermined degree of mismatch between the events of the request and the events of the data base; and
  (b) utilizing a value corresponding to the further value in the step of identifying entries having a selected degree of match.

18. A method according to claim 17 comprising the additional steps of:
  (a) forming as input to the data processor a length correction signal; and (b) utilizing a value corresponding to the length correction signal in the step of identifying entries having a selected degree of match.

19. Digital data processing means having a memory and for locating in the memory, a portion of a stored data base, the data base being represented by digital coded signals which represent the order of occurrence of plural events within each of plural entries comprising:
- (a) means for forming, as a request, a series of digital coded event signals representing events of an entry;
- (b) means for utilizing the request to form digital coded signals representing the order of occurrence of the events within the entry of the request;
- (c) means for utilizing the stored data base to form digital coded signals representing the data base order of occurrence for those events which are present in the request;
- (d) means for selecting any one of a plurality of possible degrees of match between the positional order of events in the request and the same events in the data base; and
- (e) means for utilizing the digital coded signals formed by the means (b) and (c) and the selected possible degrees of match for identifying those data base entries which have the selected degree of match.

20. Digital data processing means according to claim 19 comprising:
- (a) means for forming as input to the data processing means a pipe width signal identifying a permissible mismatch between the positional order of occurrence of events of the request and the same events in the entry of the data base; and
- (b) means for utilizing a value corresponding to the pipe width signal in the means for identifying entries having a selected degree of match.

21. Digital data processing means according to claim 20 comprising:
- (a) means for forming as input to the data processing means a further value identifying a predetermined degree of mismatch between the events of the request and the events of the data base; and
- (b) means for utilizing a value corresponding to the further value in the means for identifying entries having a selected degree of match.

22. Digital data processing means according to claim 21 comprising:
- (a) means for forming as input to the data processing means a length correction signal; and
- (b) means for utilizing a value corresponding to the length correction signal in the means for identifying entries having a selected degree of match.

23. A method according to claim 11 comprising the additional steps of:
selecting any one of a plurality of possible degrees of match between the positional order of events in the request and the same events in the data base; and
in the step (d), identifying the data base entries in each said first and second layers which have the selected possible degree of match in order of occurrence of events with events of the request.

24. A method according to claim 11 comprising the additional steps of:
forming as input to the data processor a pipe width signal identifying a permissible mismatch between the positional order of occurrence of events of the request and the corresponding events in an entry of the data base; and
utilizing a value corresponding to the pipe width signal in the step (d) of identifying data base entries which have a predetermined degree of match.

25. A method according to claim 24 comprising the additional steps of:
forming as input to the data processor a further value identifying a predetermined degree of mismatch between the events of the request and the events of the data base; and
utilizing a value corresponding to the further value in the step (d) of identifying data base entries having a predetermined degree of match.

26. A method according to claim 25 comprising the additional steps of:
forming as input to the data processor a length correction signal; and
utilizing a value corresponding to the length correction signal in the step (d) of identifying entries having a predetermined degree of match.

27. Data processing means according to claim 12 comprising:
means for selecting any one of a plurality of possible degrees of match between the positional order of events in the request and the same events in the data base; and
the means (d) comprising means for identifying the data base entries in each said first and second layers which have the selected possible degree of match in order of occurrence of events with events of the request.

28. Data processing means according to claim 12 comprising:
means for forming as input to the data processing means a pipe width signal identifying a permissible mismatch between the positional order of occurrence of events of the request and the corresponding events in an entry of the data base; and
the means (d) comprising means for utilizing a value corresponding to the pipe width signal in identifying data base entries which have a predetermined degree of match.

29. Data processing means according to claim 28 comprising:
means for forming as input to the data processing means a further value identifying a predetermined degree of mismatch between the events of the request and the events of the data base; and
the means (d) comprising means for utilizing a value corresponding to the further value in identifying data base entries having a predetermined degree of match.

30. Data processing means according to claim 29 comprising:
means for forming as input to the data processor a length correction signal; and
the means (d) comprising means for utilizing a value corresponding to the length correction signal in identifying entries having a predetermined degree of match.

31. A method utilizing a digital data processing system for creating a digital coded data base in a memory system from a plurality of coded event signals in a desired order of occurrence, at least some event signals representing the same level event and at least one event signal representing an event level which is different from another one, said events, together, representing a sequence of entries, some of said entries representing the same level entry and at least one entry representing an entry which is different from another one, the method comprising the steps of:

(a) forming a first event-time indication for each said event indicating the order of occurrence thereof and forming a second event-time indication for each said entry indicating the order of occurrence thereof; and (b) entering in the memory system a stored multi-layered data base representing said events and entries comprising the steps of (1) utilizing the first event-time indications for forming in said memory system a first data base layer comprising retrievable first layer event-time representations indicating the order of occurrence of the events within entries; and (2) utilizing the second event-time indications for forming in said memory system a second data base layer comprising retrievable second layer event-time representations indicating the order of occurrence of the corresponding entries;

the steps of entering a multi-layer data base comprising the steps of testing to determine if another entry, comprised of events, is already represented in the first data base layer and operative upon a determination that such another entry is represented for omitting the step of forming in the memory system first layer event-time representations indicating the order of occurrence of such events in such another entry, and for performing said step of forming in the memory system second layer event-time representations indicating the order of occurrence of such another entry.

32. A method according to claim 31 wherein the step of forming a first data base layer comprises the step of forming a separate retrievable first layer event-time representation for different levels of events and wherein the step of forming a second data base layer comprises the step of forming a separate retrievable second layer event-time representation for different level entries.

33. A digital data processing system having a memory, means arranged in operation to create a digital coded multiple layer data base in such memory from a plurality of coded event signals, arranged in a desired order of occurrence, at least some event signals representing the same level entry and at least one event signal representing an event level which is different from another one, said events together representing a sequence of entries, some of said entries representing the same level entry and at least one entry representing an entry which is different from another one, said means comprising:

(a) means arranged in operation to form a first event-time indication for each said event indicating the order of occurrence thereof and to form a second event-time indication for each said entry indicating the order of occurrence thereof; and (b) means arranged in operation to enter in the memory system a stored multi-layered data base representing said events and entries comprising:

(1) means arranged in operation, utilizing the first event-time indications, to form in said memory a first data base layer comprising retrievable first layer event-time representations indicating the order of occurrence of the events within the entries, and (2) means arranged in operation, utilizing the second event-time indications, to form in said memory a second data base layer comprising retrievable second layer event-time representations indicating the order of occurrence of the corresponding entries;

the means for entering a multi-layer data base comprising means for testing to determine if another entry, comprised of events, is already represented in the first data base layer and operative upon a determination that such another entry is represented for omitting the forming in the memory first layer event-time representations indicating the order of occurrence of such events in such another entry, and for forming in the memory second layer event-time representations indicating the order of occurrence of such another entry.

34. A system according to claim 33 wherein the means for forming a first data base layer comprises the means for forming a separate retrievable first layer event-time representation for different levels of events and wherein the means for forming a second data base layer comprises the means for forming a separate retrievable second layer event-time representation for different level entries.

35. A method, utilizing a digital data processing system having a memory for creating a digital coded data base in such memory from a plurality of coded event signals in a desired order of occurrence, at least some event signals representing different occurrences of the same event and at least one event signal representing an event which is different from another one, said event signals, together, representing a sequence of entries, some of said entries being the same and at least one being different, the method comprising the steps of:

(a) forming a first event-time indication for said events indicating the order of occurrence thereof and forming a second event-time indication for said entries indicating the order of occurrence thereof; and (b) entering in the memory a stored multi-layered data base representing said events and entries comprising the steps of (1) forming a first data base layer comprising the step of storing in said memory retrievable first layer event-time signals representing the first event-time indications and which represent the order of occurrence of the events within entries; and (2) forming a second data base layer comprising the step of storing in said memory retrievable second layer event-time signals which represent the second event-time indications and which represent the order of occurrence of the corresponding entries;

the step of forming a first data base layer comprising the step of forming, for each different type event, a separate retrievable first layer event-time indication which indicates all occurrences of the same type event and wherein the step of forming a second data base layer comprises the step of forming, for each different type entry, a separate retrievable second layer event-time indication which indicates all occurrences of the same type entry.

36. A digital data processing system having a memory, means arranged in operation to create a digital coded multiple layer data base in such memory from a plurality of coded event signals, arranged in a desired order of occurrence, at least some event signals representing different occurrences of the same event and at least one event signal representing an event which is different from another one, said event signals, together, representing a sequence of entries, some of said entries being the same and at least one being different, said means comprising:

(a) means arranged in operation to form a first event-time indication for said events indicating the order of occurrence thereof and to form a second event-time indication for said entries indicating the order of occurrence thereof; and (b) means arranged in operation to enter in the memory a stored multi-layered data base representing said events and entries comprising:

(1) means arranged in operation to form a first data base layer comprising means for storing in said memory retrievable first layer event-time signals representing the first event-time indications and which represent the order of occurrence of the events within the entries; and (2) means arranged in operation to form a second data base layer comprising means for storing in said memory retrievable second layer event-time signals which represent the second event-time indications and which represent the order of occurrence of the corresponding entries;

the means arranged in operation for forming a first data base layer comprising means for forming, for each different type event, a separate retrievable first layer event-time indication which indicates all occurrences of the same type event and wherein the means for forming a second data base layer comprises means for forming, for each different type entry, a separate retrievable second layer event-time indication which indicates all occurrences of the same type entry.

* * * * *